April 2, 1940.   C. L. EKSERGIAN   2,195,589
DUAL WHEEL MOUNTING
Filed Jan. 25, 1936   2 Sheets-Sheet 1

INVENTOR.
CAROLUS L. EKSERGIAN.
BY
John P. Tarbox
ATTORNEY.

April 2, 1940.　　　C. L. EKSERGIAN　　　2,195,589
DUAL WHEEL MOUNTING
Filed Jan. 25, 1936　　　2 Sheets-Sheet 2

INVENTOR.
CAROLUS L. EKSERGIAN.
BY John P. Sarbox
ATTORNEY.

Patented Apr. 2, 1940

2,195,589

UNITED STATES PATENT OFFICE 2,195,589

DUAL WHEEL MOUNTING

Carolus L. Eksergian, Detroit, Mich., assignor to Budd Wheel Company, Philadelphia, Pa., a corporation of Pennsylvania Application January 25, 1936, Serial No. 60,778

7 Claims. (Cl. 301—36)

The present invention relates to demountable wheels and more particularly to a mounting for demountable dual, disc wheels.

The main object of the invention is to provide a dual disc wheel having interchangeable inner and outer discs identical in shape and dimension and capable of being interlocked without sacrifice of identity of shape and dimension of the interlocking members on the different discs or the interchangeability of all accessory mounting elements.

Another object is to obtain maximum strength with a given weight of material and at the same time attain a strong driving connection between the wheel discs and between the wheel discs and hub while relieving the clamping-on bolts of shearing stresses, thereby permitting the use of minimum size clamping-on bolts.

A further object is to provide for improved centering, binding and wedging action in the clamping of the discs to the hub with inter-engaging parts of sufficient resiliency to eliminate lost motion and act to keep the bolting-on nuts tight.

Other objects and advantages of the invention will be apparent from a perusal of the following specification and the drawings accompanying the same.

As the inner and outer discs of the improved wheel structure are identical, a description of one will suffice for both. Each of the discs 10 comprises a central part or bolting-on flange 11 of substantially uniform cross section, and a portion 12 beyond the bolting-on flange portion of gradual and substantially uniform taper extending through the remaining portion of the disc. The flanged periphery of the disc is secured to the wheel rim 13 in any known or other suitable manner, as by arc welding, as is indicated at 14.

Figure 1:
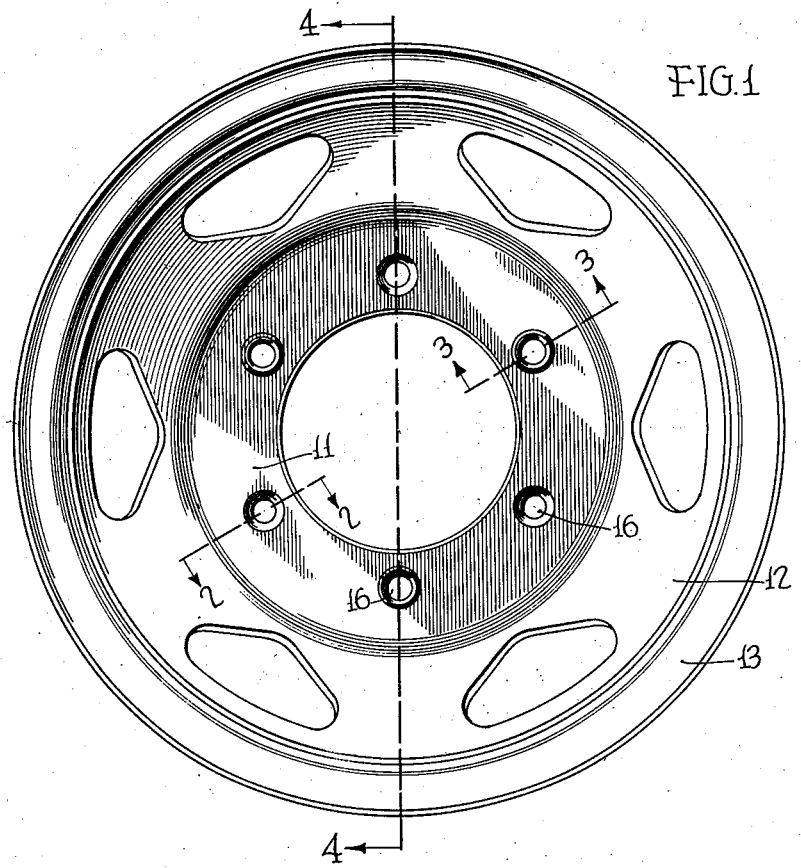
Fig. 1 is a side view of my improved wheel.
Figure 4:
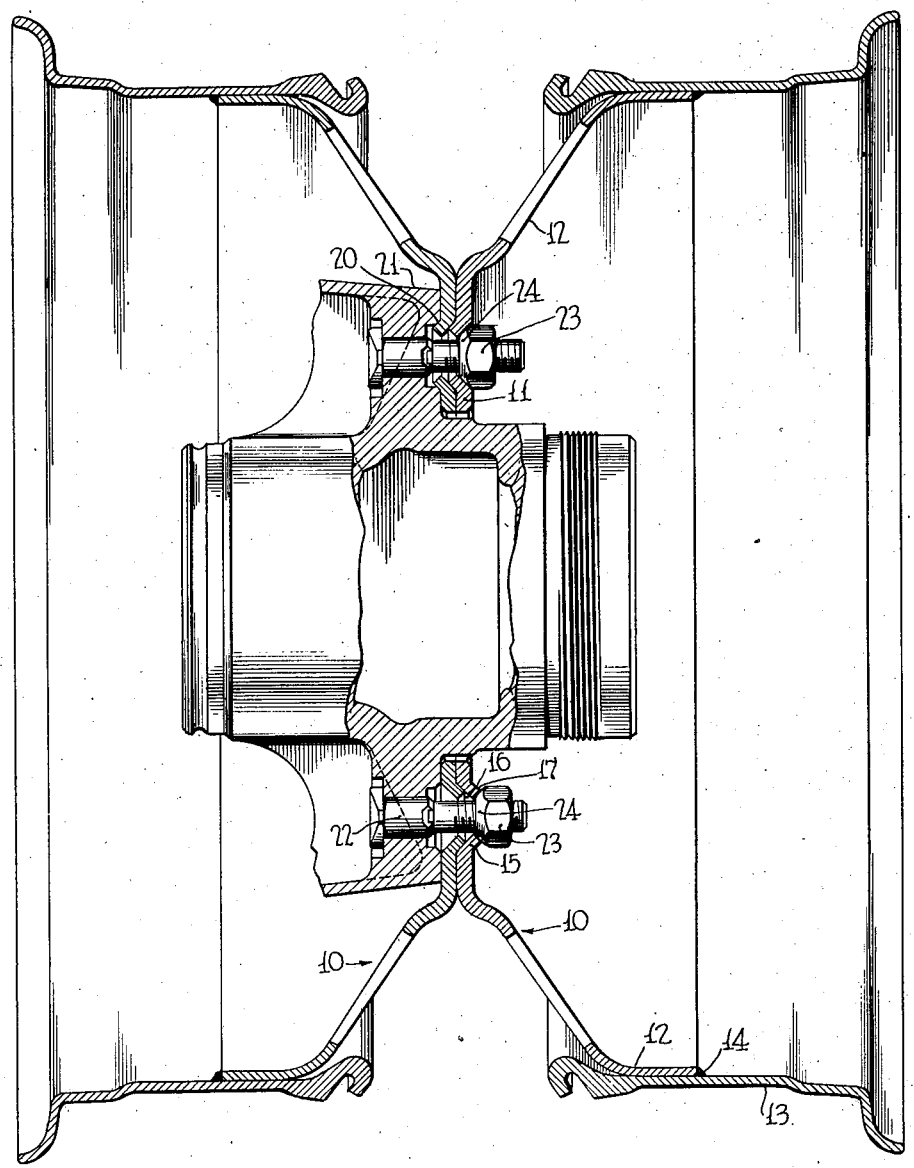
Fig. 4 is an axial view along the line 4—4 of Fig. 1.

The discs are of the demountable wheel type and are provided with axially offset inter-nesting and bolt seating bosses 15 about the bolting on holes 16. These bosses are identical in shape and dimension, but are offset axially, alternately in opposite directions, as shown in Fig. 4. Each boss has a central bolt hole therethrough and is formed with a conical radially outer surface portion 17 at its outer or projecting end and with radially inner, axially oppositely facing conical bolt seats 18 and 19, respectively, at the reverse and protruding sides of the boss. As shown in Fig. 1 the bolt holes are equally spaced around the bolting-on flange 11. Conical seats 20 formed in the hub flange 21 are of the same angularity as the radially outer conical surfaces 17, and are equal in number to the bolt holes and similarly spaced so as to register therewith. As the bosses alternate in their direction of offset conical radially outer surfaces of three alternate bosses will engage with the hub seats 20.

Clamping bolts 22 are secured in the hub flange at each of the hub seats 20 and extend axially outwardly therethrough so as to pass through the openings in the bolt hole bosses in the discs as shown in Fig. 4, and are threaded at their outer ends to receive the clamping nuts 23 provided with conical inner faces 24. As the angularity of the conical face 24 of the clamping nuts 23, the radially outer conical surfaces 17 and the radially inner oppositely facing conical surfaces 18 and 19 of the bosses are of the same angularity, the nuts 24 are adapted to engage interchangeably with either of the oppositely facing radially inner bolt seats 18 and 19, respectively, while the conical bolt seats 18 are adapted to receive either a clamping nut 23 or the radially outer conical surface of the boss of another disc.

Figures 2, 3:
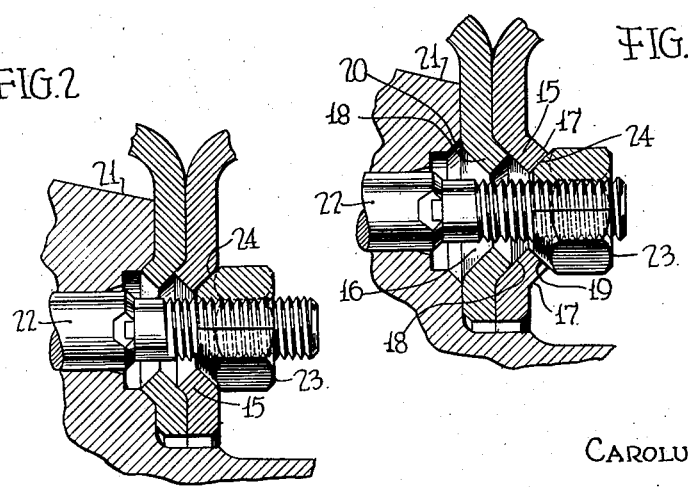
Fig. 2 is a sectional view on the line 2—2 of Fig. 1 showing one set of attaching means.
Fig. 3 is a sectional view on line 3—3 of Fig. 1 showing a second set of attaching means.

Because of the peculiar shape and arrangement of the bosses, whereby they are provided with the radially inner oppositely facing, conical bolt seats and offset to provide a radially outer conical surface, all of equal angularity, it is possible to make all of the bolt holes of the same diameter and the bosses of identical shape and at the same time have all the bosses on the different discs interchangeably inter-nesting as shown in Figs. 2, 3 and 4.

With the two wheels clamped in place on the hub, as shown in Fig. 4, axially inwardly extending bosses will engage as shown at the upper part of Fig. 4 where it will be seen that the radially outer conical surface 17 of a boss on the axially inner disc is nested within a conical hub seat 20 while the radially outer conical surface 17 of a boss on the axially outer disc nests in the radially inner conical seat 18 of the boss on the axially inner disc, the clamping nut 23 holding the parts clamped in this position by engagement of its conical surface portion 24 with the radially inner conical seat 18 of the axially outer disc. The clamping bolt and nut thus hold the two discs and the hub together against relative rotational movement, the torque being transmitted from the hub directly to the axially inner disc through the axially inwardly offset boss and from the inner disc to the outer disc through the internesting offset bosses of the different discs without shearing strain on the clamping bolt, whereby the clamping bolt may be made of minimum size to exert the required axial thrust or clamping action between the clamping nut 23 and the hub flange 21.

The other alternate bosses projecting axially outwardly of the hub, (toward the right in Fig. 4) engage as shown at the lower part of Fig. 4. Here neither of the bosses engage the hub seat 26 but extend axially outwardly so that the radially outer conical surface 17 of the axially inner disc engages the radially inner conical surface 18 at the reverse side of the boss on the outer or right hand disc and in nested relation thereto, the discs being clamped together and against the hub flange by engagement of the conical surface 24 of the clamping nut 23 with the radially inner conical seat 19 of the axially outer disc. Here also the bolt is relieved of shearing stresses as the outside or right hand disc receives its drive from the inside disc locked to the hub through the axially inwardly projecting bosses on the inside disc. As all the parts are identical in shape and dimension, the same nuts 23 may be used for engagement with the alternate oppositely offset bosses, and either disc may be used as the axially inner or outer disc of the dual wheel.

It will be noted that the peculiar angular offset of the walls of the bosses have two important consequences. In the first place, this angular offset provides a rigid section which strengthens this portion of the wheel and helps to carry the radial load. Secondly, the radially outer conical surfaces of certain of the bosses effect a centering and wedging action to center the wheel and take up all lost motion, providing a very secure and positive connection between the inner disc and the hub flange. Thus the driving torque is taken directly through one set of alternate bosses which interlock with the hub flange, the other set serving to interlock the wheels together, with substantially no shearing stress on the bolts.

What I claim is:

1. A mounting for dual demountable wheels comprising a hub flange, an interchangeable bolting-on flange for each wheel provided with alternate axially oppositely projecting conical bosses each having a bolt hole opening centrally therethrough and each boss having oppositely facing conical seats of equal angularity, the oppositely projecting bosses on one flange being arranged to internest with bosses on the other flange, all of said bosses being of substantially identical shape and dimension, said hub flange being provided with recessed conical seats each arranged to receive the projecting portion of any one of said bosses, and securing bolts passing through the holes in said bosses and said recessed seats, whereby two identical wheels may be used as elements of a dual wheel, said hub flange adjacent the point where each of the securing bolts pass through being recessed axially inwardly to provide said conical seats.

2. A mounting for dual demountable wheels comprising dual bolting-on flanges provided with internesting bosses axially offset from the respective flanges and each having a bolt hole opening centrally therethrough, each boss having a conical radially outer surface and radially inner axially oppositely facing conical seats of equal angularity, one converging in the direction of the boss and the other in the reverse direction, the radially outer conical surfaces of all the bosses being complemental to the radially inner conical seats facing in a direction reverse to the direction of the bosses, and a cone-faced nut to interchangeably engage any of said conical seats.

3. A mounting for a dual demountable wheel comprising dual bolting-on flanges provided with internesting bosses axially offset from the respective flanges and each having a bolt hole opening centrally therethrough, each boss having a conical radially outer surface and radially inner oppositely facing conical seats, one converging in the direction of the boss and the other in the reverse direction, and clamping bolts passing through the holes in said bosses and having cone-faced nuts, the angle of the radially outer surface of the bosses, the angle of both the radially inner seats of the bosses and the angle of the conical face of the nuts being substantially the same.

4. A mounting for dual demountable wheels comprising a hub flange and interchangeable bolting-on flanges, one for each wheel, each flange provided with alternate oppositely projecting conical bosses, all of said bosses being substantially identical in shape and dimension and arranged to internest with similar bosses on the other of said flanges and each boss having oppositely facing conical seats of equal angularity, said hub flange having conical recesses complemental to the radially outer surfaces of said bosses, and clamping bolts passing through central openings in said bosses and the recesses in the hub flange to hold alternate bosses only in nested engagement with each other and with alternate recesses in the hub flange and to hold other alternate bosses in nested engagement with each other only, said hub flange adjacent the point where each of the securing bolts pass through being recessed axially inwardly to provide said conical seats.

5. A mounting for dual demountable wheels comprising a hub flange and a demountable bolting-on flange for each wheel, the bolting-on flanges being provided with alternate oppositely pressed out conical nut seats forming oppositely offset bosses each having a central bolt opening, each boss forming on its reverse side a conical nut seat and on the adjoining edge of the projecting metal defining the opening another conical nut seat, all of said bosses and conical nut seats being substantially identical in configuration, and said hub flange on its part having conical seats of a configuration complemental to the radially outer conical surfaces of said offset bosses, whereby said conical nut seats associated with any of said bosses may be engaged by identical nuts.

6. A mounting for dual demountable wheels comprising a hub flange and an interchangeable bolting-on flange for each wheel, the bolting-on flanges being provided with alternate oppositely pressed out conical nut seats forming oppositely offset bosses each having a central bolt opening, each boss forming at its reverse side a conical nut seat and on the adjoining edge of the projecting metal defining the opening another conical nut seat, all of said bosses and conical nut seats being substantially identical in configuration, and said hub flange on its part having conical seats equal in number to and of a configuration complemental to the radially outer conical surfaces of said offset bosses, whereby said conical nut seats associated with any of said bosses may be engaged by identical nuts.

7. A mounting for dual demountable wheels comprising a hub flange having axially inwardly extending conical seats, interchangeable bolting-on flanges, one for each wheel, each bolting-on flange being provided with alternate axially oppositely projecting conical bosses arranged to internest with similar bosses on the other of said flanges, each of an axially and radially outer side shape and size to nest one of said conical seats of the hub flange, all of said bosses being of substantially identical shape and dimension and having oppositely facing conical seats of equal angularity, and fastening bolts on said hub flange and extending through said conical bosses, and nuts on said bolts clamping said bolting-on flanges to each other and to said hub flange, whereby said bolting-on flanges are interchangeably and reversely securable to the hub flange either as a single wheel mounting or as either an inner or outer element of a dual wheel mounting, said hub flange adjacent the point where each of the securing bolts pass through being recessed axially inwardly to provide said conical seats.

CAROLUS L. EKSERGIAN.